United States Patent Office 3,519,599
Patented July 7, 1970

3,519,599
SUBSTITUTED PHENYL BENZOATES USEFUL AS ULTRAVIOLET LIGHT INHIBITORS
Gordon C. Newland and Gerald R. Lappin, Kingsport, Tenn., assignors to Eastman Kodak Company, Rochester, N.Y., a corporation of New Jersey
No Drawing. Filed Mar. 18, 1968, Ser. No. 714,021
Int. Cl. C08f 45/58; C08c 27/66
U.S. Cl. 260—45.85
6 Claims

ABSTRACT OF THE DISCLOSURE

Substituted phenyl benzoates having the general formula

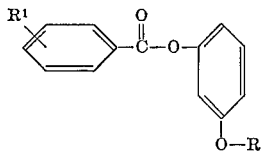

wherein R is an alkyl radical or an aryl radical and $R^1$ is hydrogen, an alkyl radical or an aryl radical; said compounds being useful as ultraviolet light inhibitors for polyolefins, cellulose esters and poly(vinyl chlorides).

---

This invention relates to a particular class of substituted phenyl benzoates and their use in polymeric materials as inhibitors against the degradative effects of ultraviolet light.

As, is well known, various polymers, such as polyolefins, poly(vinyl chlorides) and cellulose esters, undergo a photochemical degradation when exposed to ultraviolet light, particularly that which is encountered out-of-doors. This degradation appears to be a photo-oxidation process which causes rupture of the polymer chains and formation of carbonyl groups. As this degradation progresses the polymer materials tend to crack, become brittle and lose strength to the extent of mechanical failure.

One approach to the problem of degradation caused by ultraviolet light has been to incorporate into the polymeric materials certain additives which function to inhibit the degradative effects of ultraviolet light. These additives are generally referred to as ultraviolet light inhibitors. Among the various additive compounds generally useful as ultraviolet light inhibitors are the phenyl salicylates and resorcinol monobenzoate, both of which are effective in inhibiting oxidative degradation when incorporated into polymeric materials. However, problems exist with the use of both phenyl salicylates and resorcinol monobenzoate in that they tend to become discolored upon exposure to outdoor atmospherice conditions, particularly ultraviolet light and the oxides of nitrogen. As a result, the polymeric materials in which these compounds are incorporated may lose their aesthetic appeal.

Therefore, it has been found, in an effort to provide improvements over both the phenyl salicylates and resorcinol monobenzoate, that certain substituted phenyl benzoates possess good stability against discoloration upon exposure to outdoor atmospheric conditions, with particular reference to ultraviolet light and oxides of nitrogen, as well as being effective ultraviolet inhibitors for polymeric materials. The substituted phenyl benzoates of this invention are defined by the following general formula:

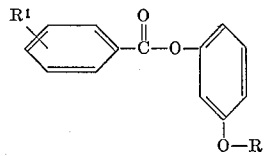

wherein R is an alkyl radical or an aryl radical; and $R^1$ is hydrogen, an alkyl radical, or an aryl radical.

The alkyl radicals which both R and $R^1$ can represent preferably have from 1 to about 20 carbon atoms. For example, these alkyl radicals may be either straight or branched chain and include such groups as methyl, ethyl, propyl, isopropyl, butyl, isobutyl, octyl, isooctyl, decyl, dodecyl, pentadecyl, 1-methylheptadecyl, octadecyl, and eicosanyl radicals.

The aryl radicals represented by R and $R^1$ may be either substituted or unsubstituted. Some examples of these radicals include phenyl, alkyl substituted phenyl, hydroxy substituted phenyl, alkoxy substituted phenyl, etc.

A particularly advantageous group of substituted phenyl benzoates are those defined by the following general formula:

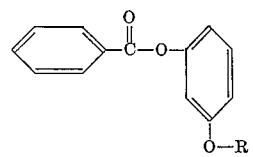

wherein R is an alkyl radical having from 1 to about 20 carbon atoms or a phenyl radical.

Those compounds described above wherein R is an alkyl radical may generally be prepared by reacting an appropriate m-hydroxyphenyl benzoate, with or without substituents on the benzoate portion of the molecule, with an appropriate alkyl halide. The lower members of the series generally are solids melting near room temperature and may be purified by vacuum distillation. Some of the higher members of the series are solids melting in the range of about 45–75° C. and may be purified by recrystallization.

The following examples will serve to further illustrate the preparation of the compounds.

EXAMPLE 1

A mixture of 74 g. of m-hydroxyphenyl benzoate, 84 g. of 1-bromododecane, 500 ml. of acetone and 30 g. of potassium carbonate is stirred and refluxed for about 120 hr. The mixture is then filtered and the filtrate evaporated to dryness. The residue is dissolved in 300 ml. of hot ethanol. On cooling, a solid product is precipitated. This is collected and recrystallized twice more from ethanol. Decolorizing charcoal is used in these final crystallizations. There is obtained 52 g. of white crystals having a melting point of about 43–44° C.

Analysis.—Calcd. for $C_{25}H_{34}O_3$ (percent): C, 78.6; H, 8.90. Found (percent): C, 78.6; H, 9.13.

EXAMPLES 2–14

Following a similar procedure as described in Example 1, m-hydroxyphenyl benzoate is reacted with appropriate alkyl halides to yield compounds having the following general formula

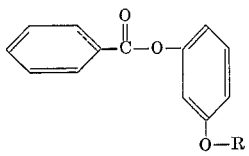

The specific compounds obtained are described in terms of the substituent R in the following table together with their boiling and melting points in some instances.

TABLE A

| Example | R | B.P., °C. at unit pressure (mm.) | M.P., ° C. |
|---|---|---|---|
| 2 | $CH_3$ | 152–155/1 | |
| 3 | $C_2H_5$ | 155–158/1 | 25–27 |
| 4 | n–$C_3H_7$ | 157–163/1 | |
| 5 | n–$C_4H_9$ | 165–168/1 | 26–28 |
| 6 | n–$C_5H_{11}$ | 178–182/1 | |
| 7 | n–$C_6H_{13}$ | 170–173/0.5 | 28–30 |
| 8 | n–$C_7H_{15}$ | 180–184/0.5 | 27–29 |
| 9 | n–$C_8H_{17}$ | 88–92/0.5 | 28–30 |
| 10 | n–$C_9H_{19}$ | 99–101/0.05 | |
| 11 | n–$C_{10}H_{21}$ | | 36–38 |
| 12 | n–$C_{14}H_{29}$ | | 48–51 |
| 13 | n–$C_{16}H_{33}$ | | 57–59 |
| 14 | n–$C_{18}H_{37}$ | | 65–67 |

EXAMPLE 15

To a solution of 18.6 g. of m-phenoxyphenol in 150 ml. of pyridine is added 14 g. of benzoyl chloride. After heating for 2 hr. at 85–90° C. the mixture is poured into water. The oil which separates is dissolved in benzene. The benzene solution is then washed with dilute hydrochloric acid, then with 5% aqueous sodium bicarbonate. The solution is dried by azeotropic distillation and then treated with decolorizing charcoal. The solution is then filtered and the benzene removed by vacuum distillation. There is obtained 27 g. of pale amber oil. The structure confirmed by infrared spectrum is m-phenoxyphenyl benzoate.

As previously mentioned, the above described substituted phenyl benzoates possess good stability against discoloration when exposed to outdoor atmospheric conditions as well as being effective ultraviolet light inhibitors for such polymeric materials as polyolefins, polyvinyl chloride and cellulose esters.

The polyolefins with which these substituted phenyl benzoates may be employed are those derived from α-monoolefinic hydrocarbons having about 2 to 10 carbon atoms. These poly-α-olefins are normally solid and may be homopolymers or copolymers (also including graft polymers, addition polymers, block polymers, etc.). Examples of these normally solid poly-α-olefins include the linear and branched, low density and high density, crystalline and amorphous, normally solid, homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene, and the like. Processes for preparing a normally solid α-olefin polymer are well known and described in detail in the prior art. See, for example, U.S. Pat. No. 2,153,553 to Fawcett et al.; U.S. Pat. No. 2,912,429 to Cash; and U.S. Pat. No. 2,917,500 to Hagemeyer et al. In general, a normally solid, α-olefin polymer is a thermoplastic material which at 20° C. is solid. It includes the so-called poly-α-olefin waxes which usually have average molecular weights in a range from about 3,000 to about 12,000.

Obviously blends of the above-described poly-α-olefins may have the substituted phenyl benzoates incorporated therein. In addition, there may also be present other types of polymers generally used as physical property improvers. The poly(vinyl chlorides) included in this invention are well known and are available from commercial sources thus requiring no further description. Again, though, it is mentioned that these polymers may also have physical property improvers blended therewith.

The cellulose esters with which the substituted phenyl benzoates may be employed are also well known and commercially available. In general these cellulose esters include cellulose acetate, cellulose acetate propionate, cellulose acetate butyrate, and the like, all of which may be prepared in accordance with conventional techniques.

Concentration of the substituted phenyl benzoates of this invention in the polymeric compositions depend generally upon the degree of ultraviolet light stabilization desired. This in turn depends upon a number of factors including subsequent environmental conditions to which the polymeric compositions are intended to be exposed. In general, however, a concentration of the substituted phenyl benzoates in a range from about 0.1 to about 10% by weight of the total polymer to be stabilized in the composition is an effective concentration for most end uses and gives satisfactory results.

The substituted phenyl benzoates may be incorporated into the polymers by any conventional technique. Generally, such incorporation is performed by such known methods as roll compounding, extrusion, solvent mixing and the like. For example, in the case of polyolefins such incorporation can be performed by heating or otherwise softening the polymeric material to a workable consistency and then working in, as by roll compounding, the substituted phenyl benzoate until a substantially uniform blend or dispersion is obtained. Generally, such incorporation takes place at the same time that other additives are normally incorporated into the polymeric material of the composition and usually along with such other additives as the formulation of the particular plastic composition requires. These other additives can include, for example, antioxidants, thermal stabilizers, anticorrosion additives, antistatic agents, foaming agents, plasticizers, colorants such as dyes and pigments, waxes, mold release agents, slip agents, anti-blocking agents, fillers, extenders, and the like including physical property improvers other than polymeric compounds.

As previously mentioned, the substituted phenyl benzoates of this invention possess good stability against discoloration upon exposure to outdoor atmospheric conditions compared to such compounds as phenyl salicylates and resorcinol monobenzoate. The following tests will serve to illustrate this feature of the substituted phenyl benzoates.

GAS YELLOWING TEST

A 1.0 wt. percent solution of each of the compounds listed in Table B in acetone is prepared. A few drops of each solution is placed on a 9 cm. filter paper and the acetone is allowed to evaporate. Each of the samples is then exposed for about 24 hours in a fume chamber containing off-gases from burning natural gas as described in the Technical Manual of the American Association of Textile Chemists, vol. 40, Part 2, B–75, (1964), Standard Test Method 23–1962. The results of this test are indicated in Table B.

TABLE B

| Compound | Color before exposure | Color after exposure |
|---|---|---|
| Resorcinol monobenzoate | None | Very yellow. |
| m-Methoxyphenyl benzoate | do | None. |
| m-Ethoxyphenyl benzoate | do | Do. |
| m-Propoxyphenyl benzoate | do | Do. |
| m-Hexyloxyphenyl benzoate | Slight tan | Slight tan. |
| m-Dodecyloxyphenyl benzoate | None | None. |
| m-Octadecyloxyphenyl benzoate | Slight tan | Slight tan. |

As is apparent from the above results, the substituted phenyl benzoates of this invention are essentially unaffected by the test while resorcinol monobenzoate became badly discolored.

OUTDOOR WEATHERING TEST

Polyethylene 0.92 in density and having a melt index of 2.0 (ASTM–D1248–52T) and a mean molecular weight of 30,000 is blended with each of the additives in Table C on hot-compounding rolls. The roll temperatures are 270° F. and 220° F. and a milling time of 4 minutes is used. The roll slabs containing the additives are then compression molded into flat plates ⅛-in. thick. Specimens ½ by 1½ in. are cut from these plates, bent into a U and inserted upside down in a ½-in. wide channel and exposed to natural weather at Kingsport, Tennessee while under stress. The specimens are observed periodically for the appearance of cracks in the specimen's surface. The exposure time in months required to develop cracks visible to the unaided eye is defined as the stress-crack life. The color of the samples is also noted at the time of failure. Each of the samples are colorless at the beginning of the test. The results of the tests on stabilized and unstabilized polyethylene compositions are summarized in Table C.

TABLE C

| Additive | Stress-crack life (mos.) | Exposed color |
|---|---|---|
| None | 19 | |
| m-Pentadecylphenyl salicylate | >66 | Yellow. |
| p-Tert-butylphenyl salicylate | 51 | Yellow-green. |
| p-Octylphenyl salicylate | 91 | Do. |
| p-Biphenylyl salicylate | 63 | Yellow. |
| p-Octylphenyl-3-phenyl salicylate | >91 | Yellow-green. |
| m-Methoxyphenyl benzoate | 34 | Colorless. |
| m-Ethoxyphenyl benzoate | 42 | Do. |
| m-Propoxyphenyl benzoate | 47 | Do. |
| m-Butoxyphenyl benzoate | >67 | Do. |
| m-Amyloxyphenyl benzoate | 60 | Do. |
| m-Hexyloxyphenyl benzoate | >67 | Do. |
| m-Heptyloxyphenyl benzoate | >67 | Do. |
| m-Octyloxyphenyl benzoate | >67 | Do. |
| m-Nonyloxyphenyl benzoate | >67 | Do. |
| m-Decyloxyphenyl benzoate | >67 | Do. |
| m-Dodecyloxyphenyl benzoate | >67 | Do. |
| m-Tetradecyloxyphenyl benzoate | 21 | Do. |
| m-Hexadecyloxyphenyl benzoate | >67 | Do. |
| m-Octadecyloxyphenyl benzoate | >67 | Do. |
| m-Phenoxyphenyl benzoate | >67 | Do. |

As is apparent from the above results the substituted phenyl benzoates of this invention not only are effective ultraviolet light inhibitors for polyethylene but also possess good stability against discoloration compared to phenyl salicylates.

The substituted phenyl benzoates of this invention are also effective ultraviolet inhibitors in polypropylene and cellulose esters as is demonstrated by the following evaluations. In the evaluations the substituted phenyl benzoates have the following general formula

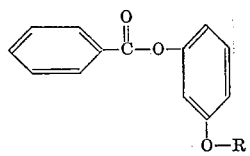

The specific compounds employed in the evaluations are identified by reference to the substituent R in the above general formula.

In the first series of evaluations the compounds to be evaluated as ultraviolet light inhibitors are added at a concentration level of 5% by weight to 0.4 g. of polypropylene, ($\{n\}=1.53$). Ten ml. of tetralin is added and the mixture heated to 145° C. to form a dope. The dope is then cast onto a ferrotype plate at a temperature of 143° C. and the tetralin is evaporated to leave a 3 mil-thick film of the polypropylene containing the additive. Specimens 2½ by ½ in. are cut from these films and exposed in a modified Atlas Twin Arc Weather-ometer, [Anal. Chem. 25 460 (1953)]. The exposure times required to embrittle the films containing the stabilizers and the film containing no stabilizer are determined. Embrittlement is defined to have occurred when the film specimens break during creasing with the exposed side of the specimen on the outside of the crease. A stabilization rating is calculated as the ratio of the exposure time required to embrittle the film containing the additive to that required to embrittle the film without stabilizer. The results of these tests are summarized in column 2 of Table D.

In a second series of evaluations polypropylene having a melt flow of 4.5 and an I.V. of 1.6 is admixed on a C. W. Brabender plastagraph with the additives to be evaluated. The admixed composition is injection molded at 425° F. into tensile specimens 1/16 in. thick by 2½ in. long. These specimens are bent into a U and inserted upside down in a channel ⅝ in. wide and then exposed to weathering in this stressed condition. The hours of exposure in a modified Atlas Twin Arc Weather-ometer required to develop cracks in the surface of the specimens is determined. Three specimens of each composition are exposed and the average hours of exposure required to develop cracks visible under 3× magnification is defined as the stress-crack life. The results of the tests on compositions containing 1% additive are summarized in column 3 of Table D.

In a third series of evaluations the compounds to be tested are mixed with cellulose acetate butyrate (13% acetyl, 38% butyryl) and plasticizer by hot roll compounding. The front and rear roll being maintained at 270° C. and 230° F., respectively. The ratio of additives are: 100 parts cellulose acetate butyrate:12 parts plasticizer (dibutyl sebacate):1 part ultraviolet light inhibitor. Test specimens are cut from a 50 mil compression molded plate and exposed in a XWR Atlas Weather-ometer and their resistance to weathering measured by Tour-Marshall flexural strength procedure (ASTM–D747.43). The specimens are defined to be brittle when they break at a flexing angle less than 50°. The results of these evaluations are summarized in column 4, Table D.

TABLE D

| 1 | 2 | 3 | 4 |
|---|---|---|---|
| R | Stabilization rating | Stress-crack life, hr. | Embrittlement time, hr. |
| No additive | 1.0 | 118 | 430 |
| $CH_3$ | | | >1,800 |
| $C_2H_5$ | 3.0 | 283 | >1,800 |
| $C_3H_7$ | 6.0 | 283 | >1,800 |
| $C_4H_9$ | 3.0 | 283 | >1,800 |
| $C_5H_{11}$ | 3.0 | 236 | >1,800 |
| $C_6H_{13}$ | 3.0 | 354 | >1,800 |
| $C_7H_{15}$ | 12.0 | 332 | >1,800 |
| $C_8H_{17}$ | 3.0 | 354 | >1,800 |
| $C_9H_{19}$ | 6.0 | 444 | >1,800 |
| $C_{10}H_{21}$ | 18.0 | 354 | >1,800 |
| $C_{12}H_{25}$ | 23.0 | 354 | >1,800 |
| $C_{14}H_{29}$ | 9.0 | 118 | >1,800 |
| $C_{16}H_{33}$ | 6.0 | 330 | >1,800 |
| $C_{18}H_{37}$ | 6.0 | 306 | >1,800 |
| ⌬ | 12.0 | 276 | >1,800 |

In another series of evaluations the substituted phenyl benzoates of this invention are shown to have good stability against discoloration. In these evaluations poly(vinylchloride) is admixed with 30 p.p.h. plasticizer dioctylphthalate, 2 p.p.h. of heat stabilizer Advostab T360 and 2 p.p.h. of m-dodecyloxyphenylbenzoate on hot compounding rolls. The rear and front rolls are maintained at 290 and 310° C., respectively. A composition containing only the heat stabilizer and plasticizer is also compounded as a control. Specimens are cut from plates molded from these rolled compositions and exposed outdoors at Kingsport, Tennessee and their respectively weatherability assessed by observations of color formation. The composition containing the heat stabilizer alone is observed to develop a black color after four months of exposure. The composition containing the phenyl benzoate derivative is still free from color formation after two years of exposure to the same conditions. This also indicates the effectiveness of m-dodecyloxyphenyl benzoate as an ultraviolet light inhibitor for poly(vinyl chloride).

The polymeric materials stabilized against the degradative effects of ultraviolet light with substituted phenyl benzoates as described above can be employed in various shaped articles, coatings etc. Thus, the composition can be made into pellets, sheeting, films, bars, tubes, filaments, fibers, specially shaped structural elements and the like as by conventional casting and molding techniques which include extrusion, blow molding and the like.

Thus, having described the invention in detail it will be understood that certain variations and modifications may be made with the spirit and scope of the invention as defined in the specification and appended claims.

We claim:
1. A composition comprising
   (A) a polymeric material selected from the group consisting of
      (1) at least one poly-α-olefin derived from α-monoolefin hydrocarbons having 2 to 10 carbon atoms,
      (2) poly(vinyl chloride), and
      (3) cellulose esters,
   (B) and a stabilizing amount of at least one substituted phenyl benzoate having the general formula

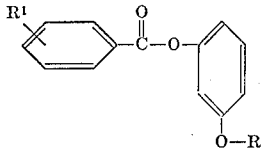

wherein R is an alkyl radical of 1 to 20 carbon atoms or an aryl radical and $R^1$ is hydrogen, an alkyl radical of 1 to 20 carbon atoms or an aryl radical, each of said aryl radicals being selected from phenyl, alkyl substituted phenyl wherein the alkyl portion is from 1 to 20 carbons, hydroxy substituted phenyl, and alkoxy substituted phenyl wherein the alkoxy portion is from 1 to 20 carbons.

2. A composition according to claim 1 wherein the polymeric material is at least one poly-α-olefin and R and $R^1$ are each phenyl or naphthyl.

3. A composition according to claim 1 wherein said substituted phenyl benzoate has the general formula

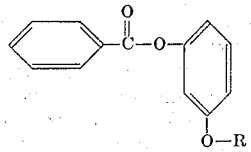

wherein R is an alkyl radical having 1 to 20 carbon atoms or a phenyl radical.

4. A composition according to claim 3 wherein said poly-α-olefin is polypropylene.

5. A composition according to claim 3 wherein said poly-α-olefin is polyethylene.

6. A composition according to claim 3 wherein said poly-α-olefin is a copolymer of ethylene and propylene.

References Cited

UNITED STATES PATENTS

| | | | |
|---|---|---|---|
| 2,666,039 | 1/1954 | Reid et al. | 260—31.2 |
| 2,910,453 | 10/1959 | Gordon | 260—45.85 |
| 3,072,602 | 1/1963 | Clark | 260—45.85 |

DONALD E. CZAJA, Primary Examiner

V. P. HOKE, Assistant Examiner

U.S. Cl. X.R.

106—174, 178; 260—473, 476